US011379666B2

United States Patent
Qi et al.

(10) Patent No.: US 11,379,666 B2
(45) Date of Patent: Jul. 5, 2022

(54) SUGGESTION OF NEW ENTITY TYPES WITH DISCRIMINATIVE TERM IMPORTANCE ANALYSIS

(71) Applicant: International Business Machines Corporation, Armonk, NY (US)

(72) Inventors: Haode Qi, Cambridge, MA (US); Ming Tan, Malden, MA (US); Yang Yu, Acton, MA (US); Navneet N. Rao, Arlington, MA (US); Saloni Potdar, Arlington, MA (US); Haoyu Wang, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/843,872

(22) Filed: Apr. 8, 2020

(65) Prior Publication Data

US 2021/0319182 A1 Oct. 14, 2021

(51) Int. Cl.
*G06F 40/295* (2020.01)
*G06F 40/284* (2020.01)
*H04L 51/02* (2022.01)

(52) U.S. Cl.
CPC .......... *G06F 40/295* (2020.01); *G06F 40/284* (2020.01); *H04L 51/02* (2013.01)

(58) Field of Classification Search
CPC .... G06F 40/279; G06F 40/284; G06F 40/289; G06F 40/295
See application file for complete search history.

(56) References Cited

U.S. PATENT DOCUMENTS

| | | | |
|---|---|---|---|
| 9,190,055 B1 * | 11/2015 | Kiss | G10L 15/07 |
| 10,198,491 B1 * | 2/2019 | Semturs | G06F 16/951 |
| 10,382,379 B1 * | 8/2019 | Zhang | G06F 16/24578 |
| 10,817,787 B1 * | 10/2020 | Zhang | G06N 5/046 |
| 10,848,808 B2 * | 11/2020 | Drako | H04N 21/41407 |
| 2004/0098385 A1 | 5/2004 | Mayfield et al. | |
| 2011/0131157 A1 | 6/2011 | Iyer et al. | |
| 2017/0220687 A1 | 8/2017 | Hawking et al. | |

(Continued)

FOREIGN PATENT DOCUMENTS

WO WO2019/024704 A1 7/2019

OTHER PUBLICATIONS

Gupta, Sonal et al., "SPIED: Stanford Pattern-based Information Extraction and Diagnostics", Proceedings of the Workshop on Interactive Language Learning, Visualization, and Interfaces, Baltimore, Maryland, USA, Jun. 27, 2014, 7 pages.

(Continued)

*Primary Examiner* — Paras D Shah
(74) *Attorney, Agent, or Firm* — Stephen J. Walder, Jr.; Jorge Maranto

(57) ABSTRACT

A mechanism is provided to implement suggestion of new entity types with discriminative importance analysis. The mechanism obtains a list of predefined intents from a chatbot designer. The mechanism receives an input sentence having a target intent within the list of predefined intents. The mechanism performs intent-specific importance analysis on the input sentence to generate an importance score for each token in the input sentence. The mechanism ranks the tokens in the input sentence by importance score and outputs a token with a highest importance score as a candidate entity type.

18 Claims, 7 Drawing Sheets

(56) References Cited

U.S. PATENT DOCUMENTS

| | | | |
|---|---|---|---|
| 2018/0075128 A1* | 3/2018 | Srinivasan | G06Q 30/0201 |
| 2018/0239822 A1* | 8/2018 | Reshef | G06F 40/242 |
| 2018/0357238 A1 | 12/2018 | Cowan et al. | |
| 2019/0042560 A1* | 2/2019 | Kakirwar | G06F 40/295 |
| 2019/0294676 A1 | 9/2019 | Sapugay et al. | |
| 2019/0327331 A1* | 10/2019 | Natarajan | G06F 16/3323 |
| 2020/0311344 A1* | 10/2020 | Tripathi | G06F 40/284 |
| 2021/0042372 A1* | 2/2021 | Huang | G06F 16/9538 |
| 2021/0056169 A1* | 2/2021 | Bahirwani | G06F 40/35 |
| 2021/0089587 A1* | 3/2021 | Gupta | G06F 16/3344 |

OTHER PUBLICATIONS

Jones, Karen S., "A statistical interpretation of term specificity and its application in retrieval", Reprinted from: Journal of Documentation vol. 60 No. 5 2004, 9 pages.

Ribeiro, Marco T. et al., "Why Should I Trust You? Explaining the Predictions of Any Classifier", ACM SIGKDD 2016 Conference on Knowledge Discovery & Data Mining Aug. 13-17, 2016, San Francisco, USA, 10 pages.

Sari, Yunita et al., "Rule-based pattern extractor and named entity recognition: A hybrid approach", 2010 International Symposium on Information Technology, Kuala Lumpur, Jun. 15-17, 2010, (Abstract Only).

* cited by examiner

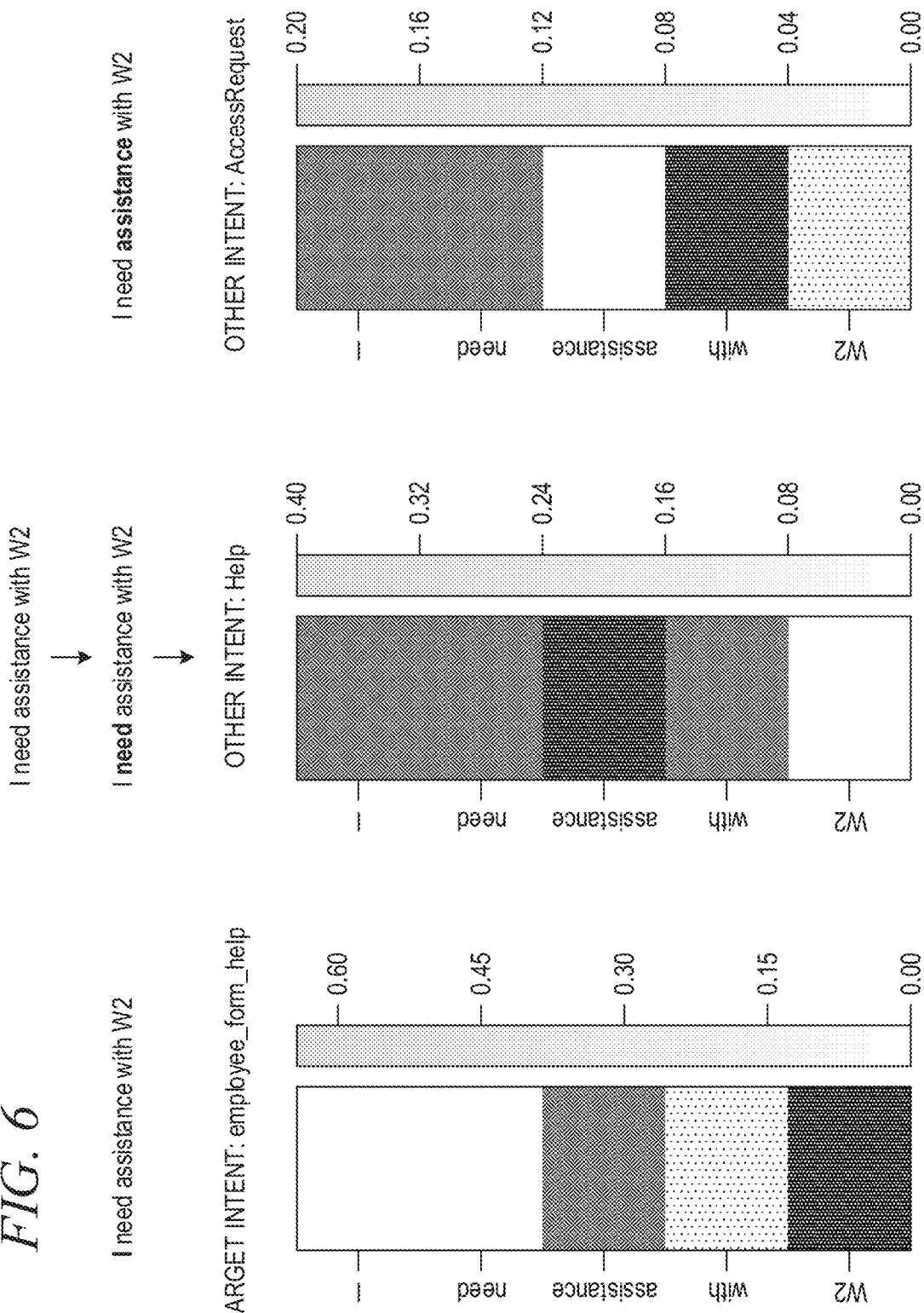

| TOKENS | I | need | assistance | with | W2 |
|---|---|---|---|---|---|
| IMPORTANCE SCORE | 0 | 0 | 0.35 | 0 | 0.65 |
| ADJUSTED SCORE | NA | -0.10 | 0.15 | NA | 0.65 |

| CANDIDATE TOKENS | ADJUSTED SCORE |
|---|---|
| W2 | 0.65 |
| assistance | 0.15 |
| need | -0.10 |

SUGGESTION OF NEW ENTITY TYPES WITH DISCRIMINATIVE TERM IMPORTANCE ANALYSIS

BACKGROUND

The present application relates generally to an improved data processing apparatus and method and more specifically to mechanisms for suggesting new entity types with discriminative term importance analysis.

The IBM Watson® Conversation Service allows an administrator to create an application and user agents that understand natural language input and communicate with users simulating a real human conversation. Conversation services respond to customers in a way that simulates a conversation between humans. Users interact with the application through one or more interfaces. Common choices might be messaging services, a chat window within a Web site, or even audio interfaces when combined with a speech-to-text service. The application sends the user input to the conversation service.

The application connects to a workspace. The natural language processing for the conversation service happens inside a workspace, which is a container for all the artifacts that define the conversation flow for an application. Each workspace is trained to recognize certain concepts and to direct the conversation flow that governs user interaction. The conversation service interprets user input, directs the flow of the conversation, and gathers information that it needs. Based on identified concepts, the conversation service directs the conversation flow to provide the user with information or to gather additional information from the user.

The application can also interact with existing back-end systems based on the user's intent and additional information. For example, the application may search for information in public or private databases, open tickets, show diagrams and maps, or write the user input into systems of record.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising a processor and a memory, the memory comprising instructions that are executed by the processor to specifically configure the processor to implement suggestion of new entity types with discriminative importance analysis. The method comprises obtaining a list of predefined intents from a chatbot designer and receiving an input sentence having a target intent within the list of predefined intents. The method further comprises performing intent-specific importance analysis on the input sentence to generate an importance score for each token in the input sentence. The method further comprises ranking the tokens in the input sentence by importance score and outputting a token with a highest importance score as a candidate entity type.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 illustrates an example of importance analysis based on adversarial inputs in accordance with an illustrative embodiment;

DETAILED DESCRIPTION

Figure 1:
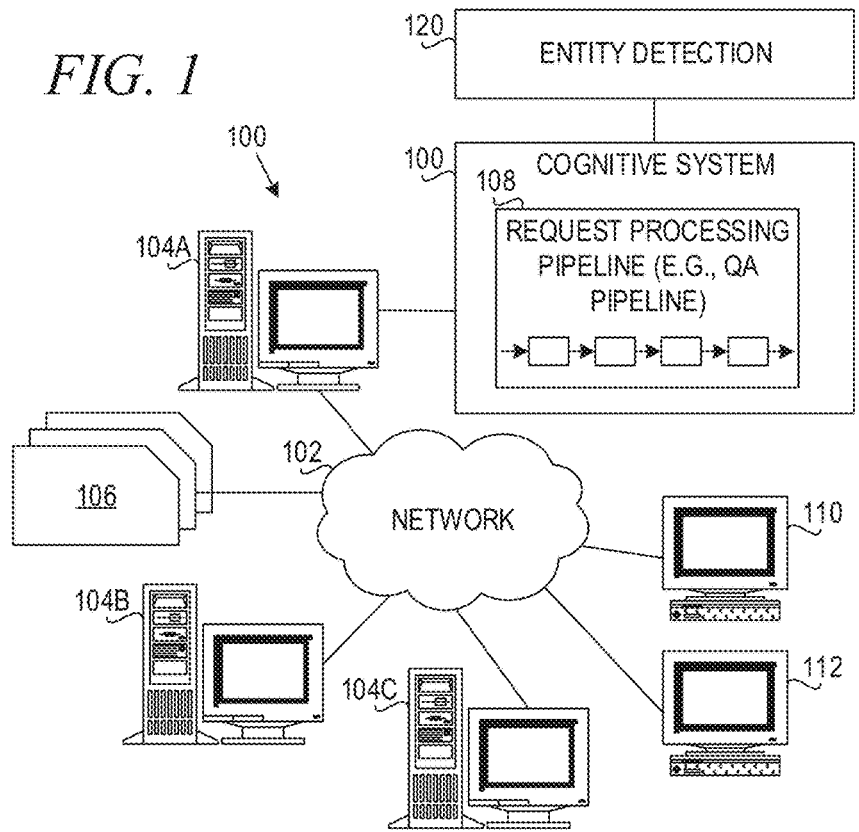
FIG. 1 depicts a schematic diagram of one illustrative embodiment of a cognitive healthcare system in a computer network.

Conversational systems are rapidly gaining popularity as a mechanism to provide a more natural and intuitive way to interact with real world systems. Businesses and applications in a variety of different domains are using conversational systems as part of their user interfaces to provide a better quality of service and a richer experience to explore available information, make informed decisions and materialize business transactions. Conversational systems can be broadly classified into two categories. One category includes systems that are pre-built and available as part other products, such as operating systems, mobile phones and other electronic devices. The other category includes custom or domain-specific conversational systems that are general-purpose or targeted for applications, such as finance, travel, healthcare, etc. This type of conversational system can be custom built using existing services such as the IBM Watson® Conversation Service.

Aspects of the illustrative embodiments described herein may be applied to this second category of conversational systems, particularly highlighting the limitations of the services available for building such conversational systems (or agents). The illustrative embodiments propose a new architecture to build data driven conversational systems to overcome these limitations. Building a conversational system (or agent or chatbot) using existing conversational services requires intents, entities, and dialog.

Intents represent the purpose or goal expressed in the user input/query. Conversational services typically use a Deep Learning network to identify intents from a given user query within the context of a conversation. As a consequence, most systems require upfront specification of all intents with labeled query examples for training a neural network. These intents are usually based on the purpose of the business application and the scope of questions that it intends to handle and the anticipated set of questions that users might ask within the scope of the business application.

Entities represent real-world objects relevant to the context of a user query. The conversational system chooses specific actions based on identification of entities within a specific intent. These need to be provided as a set of predefined entities with examples and domain-specific synonyms (the domain vocabulary) relevant within the context of the conversational application.

A dialog is the structural representation of the flow of conversation for a conversational agent. There are different ways of representing such a structure, e.g., a tree, a state machine, etc. The dialog uses discovered intents, entities, and context from the application to provide an interactive conversational experience to the user. For available conversational services, the dialog must be statically defined at the time of instantiation of the service. This requires the manual specification of all possible conversational flows that the conversational agent is required to handle up front. This leaves little room for flexibility or dynamic interaction through learning from user interactions and data-driven context.

For modern artificial intelligence (AI) chatbots, use of entity is important to extract fine-grained information from a general intent. Entities help to further differentiate the underlying meaning of an utterance and to reduce the redundancy of similar utterances in the same intent. The synergy of pairing intent classification with entity could improve AI chatbot services. Traditional entity definition only includes time, date, location, person name, organization, etc. With increased complexity and expanded scope of modern chatbots, efficient suggestion of new entity type will be helpful for chatbot builders.

Out-of-the-box Named-Entity Recognition (NER) systems only work with limited types of entities. Existing new entity type discovery methods require iterative training that can be very time consuming. Also, these methods require the user to provide a seed set of entity types, which requires domain expert knowledge and limits the type of entity being suggested. Being able to identify new entity types and label them efficiently is crucial to scaling up the usability of a chatbot.

The illustrative embodiments propose a general framework to suggest new entity types efficiently. The framework performs importance analysis on all intents for a target sentence. For the target sentence, the framework performs part-of-speech (POS) tag filtering and stop-word filtering. For the remaining entity candidates, the framework performs discriminative importance score adjustment for target intent against all other intents. The framework then performs re-ranking on the adjusted importance score. The framework selects the final entity candidates based on a threshold.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general-purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
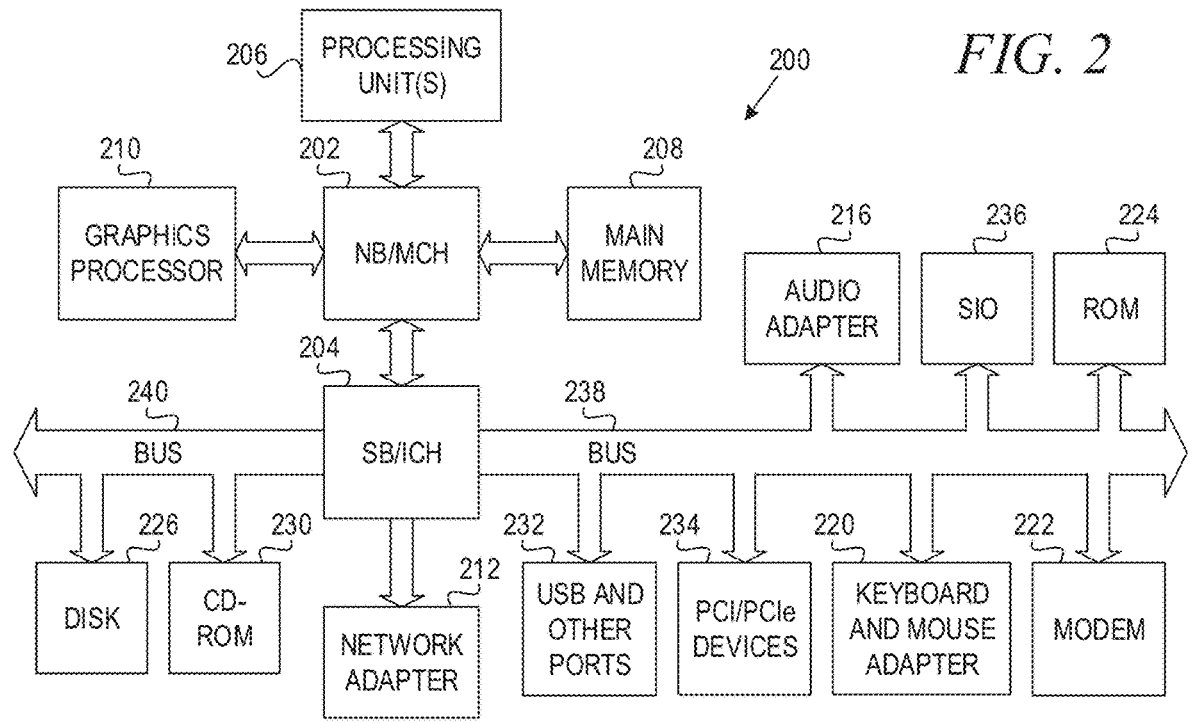
FIG. 2 is a block diagram of an example data processing system in which aspects of the illustrative embodiments are implemented.

As noted above, the present invention provides mechanisms for natural language processing, machine learning, ontology-based artifact generation for the conversation system. The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 is directed to describing an example cognitive system for conversational applications which implements a request processing pipeline, request processing methodology, and request processing computer program product with which the mechanisms of the illustrative embodiments are implemented. These requests may be provided as structured or unstructured request messages, or any other suitable format for requesting an operation to be performed by the conversational system.

It should be appreciated that the conversational system, while shown as having a single request processing pipeline in the examples hereafter, may in fact have multiple request processing pipelines. Each request processing pipeline may be separately trained and/or configured to process requests associated with different domains or be configured to perform the same or different analysis on input requests, depending on the desired implementation. For example, the request processing pipelines may be configured to provide different types of cognitive functions or support different types of business applications.

As will be discussed in greater detail hereafter, the illustrative embodiments may be integrated in, augment, and extend the functionality of these mechanisms of a conversational system with regard to suggestion of new entity types with discriminative term importance analysis. Thus, it is important to first have an understanding of how cognitive systems are implemented before describing how the mechanisms of the illustrative embodiments are integrated in and augment such cognitive systems and request processing pipeline mechanisms. It should be appreciated that the mechanisms described in FIG. 1 are only examples and are not intended to state or imply any limitation with regard to the type of cognitive system mechanisms with which the illustrative embodiments are implemented. Many modifications to the example cognitive system shown in FIG. 1 may be implemented in various embodiments of the present invention without departing from the spirit and scope of the present invention.

FIG. 1 depicts a schematic diagram of one illustrative embodiment of a cognitive system 100 implementing a request processing pipeline 108 in a computer network 102. The cognitive system 100 is implemented on one or more computing devices 104A-C (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-C. The network 102 includes multiple computing devices 104A-C, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 may provide cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, or the like, and the answer may be returned in a natural language format maximized for efficient comprehension in a point-of-care clinical setting. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-C on the network 102 include access points for content creators and cognitive system users. Some of the computing devices 104A-C include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

The cognitive system 100 implements the pipeline 108, which comprises a plurality of stages for processing an input request based on information obtained from the corpus or corpora of data 106. The pipeline 108 generates responses for the input request based on the processing of the input request and the corpus or corpora of data 106.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for entity detection engine 120 for suggesting new entity types with discriminative term importance analysis. The illustrative embodiments propose a framework to suggest new entity types efficiently. The framework performs importance analysis on all intents for a target sentence. For the target sentence, the framework performs part-of-speech (POS) tag filtering and stop-word filtering. For the remaining entity candidates, the framework performs discriminative importance score adjustment for target intent against all other intents. The framework performs re-ranking on the adjusted importance scores and selects final entity candidates based on a threshold.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements a cognitive system 100 augmented to include the additional mechanisms of the illustrative embodiments described hereafter.

In the depicted example, data processing system 200 employs a hub architecture including North Bridge and Memory Controller Hub (NB/MCH) 202 and South Bridge and Input/Output (I/O) Controller Hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
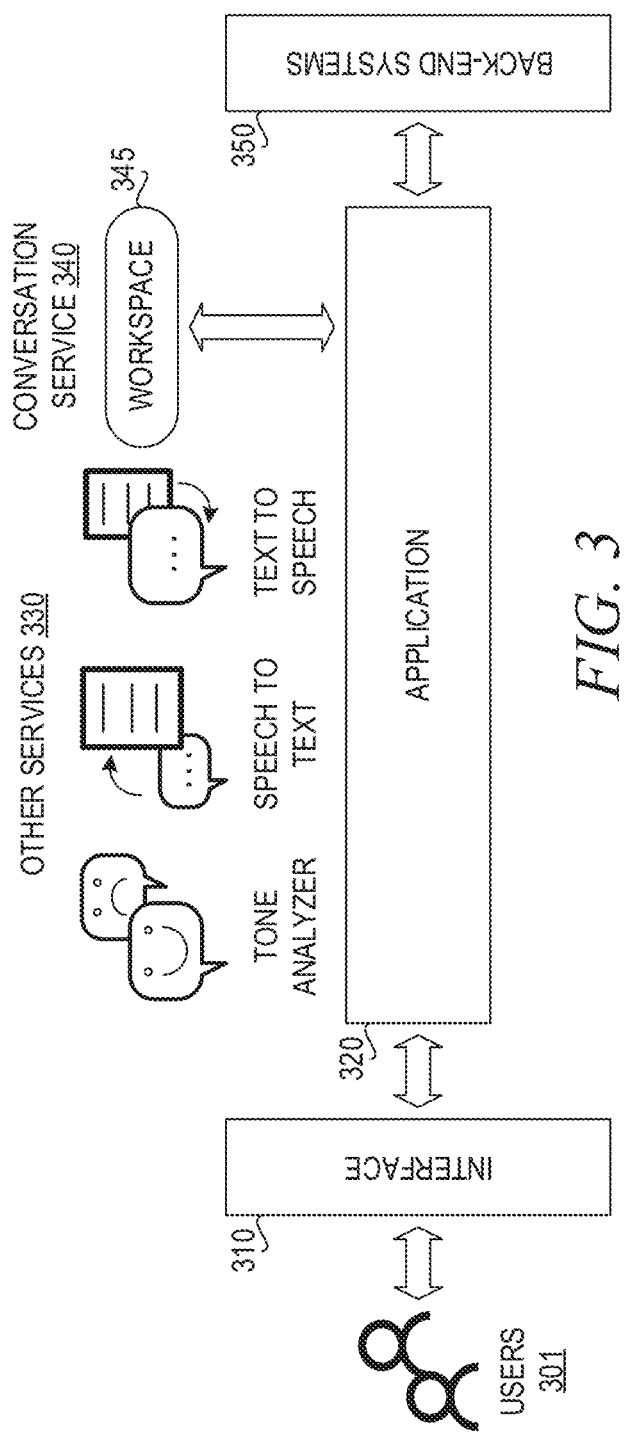
FIG. 3 is a block diagram of a conversational system in accordance with an illustrative embodiment.

FIG. 3 is a block diagram of a conversational system in accordance with an illustrative embodiment. Users 301 interact with application 320 through interface 310, which may be a messaging service, chat window within a Web site, an audio interface, or the like. Application 320 processes the user input using other services 330, which include a tone analyzer, speech-to-text conversion, and text-to-speech conversion.

Application 320 sends the user input to the conversation service 340. The application 320 connects to workspace 345. The natural language processing for the conversation service happens inside workspace 345, which is a container for all the artifacts that define the conversation flow for application 320. Each workspace 345 is trained to recognize certain concepts and to direct the conversation flow that governs the interaction. The conversation service interprets the user input, directs the flow of the conversation, and gathers information that it needs. In one embodiment, the conversation service uses machine learning to identify the concepts it was trained for. Based on concepts it identifies, the conversation service directs the conversation flow to provide the user with information or to gather additional information from users 301.

Application 320 also interacts with back-end systems 350 based on the user's intent and additional information. Examples of user intent include the following: search for information in public or private databases, open tickets, show diagrams and maps, or write the user input into systems of record.

Figure 4:
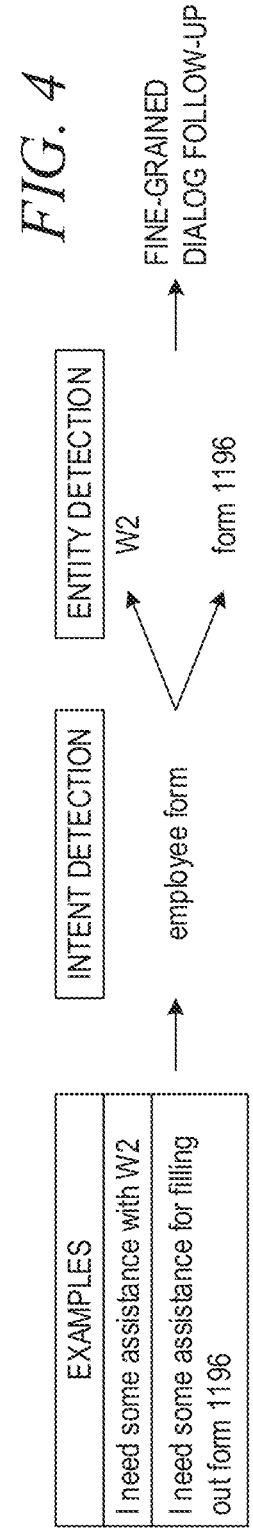
FIG. 4 illustrates an example of intent and entity detection in accordance with an illustrative embodiment.

FIG. 4 illustrates an example of intent and entity detection in accordance with an illustrative embodiment. Given the example input sentences, intent detection identifies the user intent as "employee form help." Then, entity detection identifies the entities as "W2" and "form 1196." Given the user intent and the detected entities, the conversation system the performs fine-grained dialog follow-up.

Existing methods for discovering entities use open-sourced data and pre-trained NER models. Open-sourced data only defines popular entity types like Name, Location, Organization, etc. Open-sourced data have different grammatical structure and context compared to data defined by a client. Pre-trained NER models are usually trained on open-sourced data.

Other existing methods for discovering new entities use labelled data manually. A manual labelling process is tedious and requires domain knowledge. Labelled entities that are not informative are a waste of resources and mislead the dialog.

Existing approaches to new entity type discovery (entity linking) require provision of seed entity sets that could limit the type of entities being discovered and require good domain knowledge. These approaches require training that could be very time consuming. Existing entity discovery methods are independent from the chatbot and do not utilize information from intent classification.

The illustrative embodiments provide a framework that helps uses to extend beyond traditional name entity types by providing automatic suggestion of entity candidates that utilize the existing text classifier. The information from both the workspace data and the text classifier are synergized to make informative suggestions for chatbot use case. The illustrative embodiments suggest new entity types without requiring additional training. The illustrative embodiments do not require provision of a seed entity set that requires domain expert knowledge and limits the type of entity being suggested.

Figure 5:
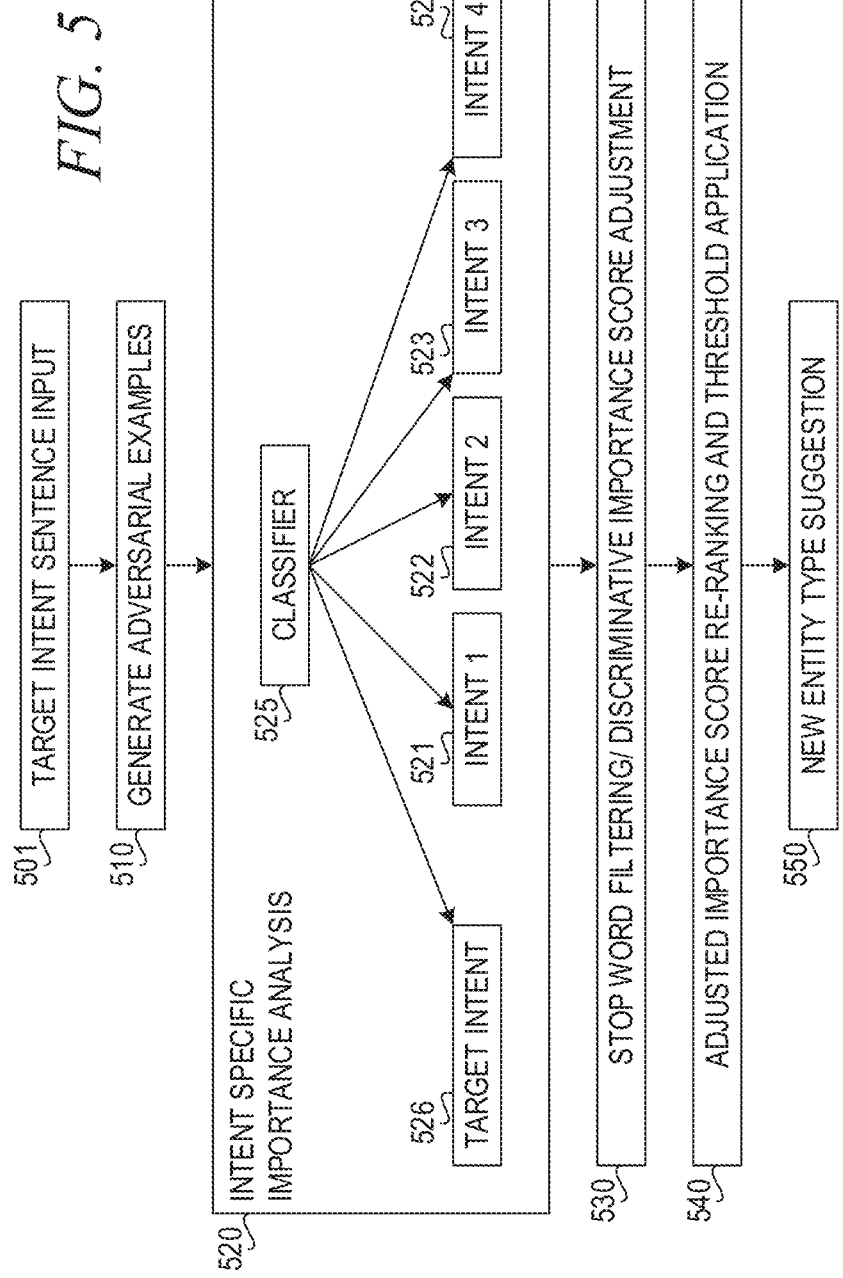
FIG. 5 is a block diagram illustrating a framework for suggesting new entity types with discriminative term importance analysis in accordance with an illustrative embodiment.

FIG. 5 is a block diagram illustrating a framework for suggesting new entity types with discriminative term importance analysis in accordance with an illustrative embodiment. The framework receives target intent sentence input (block 501) and generates adversarial examples (block 510). The framework then performs intent specific importance analysis (block 520). Classifier 525 classifies the target intent sentence input as target intent 526 and classifies the adversarial examples as intent 1 521, intent 2 522, intent 3 523, and intent 4 524. The example depicted in FIG. 5 shows four other intents 521-524; however, any number of adversarial examples and corresponding intents may be generated depending on the implementation.

The framework then performs stop word filtering for the target sentence and performs discriminative importance score adjustment for the other entity candidates (block 530). Then, the framework performs adjusted importance score re-ranking and threshold application (block 540). Thereafter, the framework provides new entity type suggestions (block 550).

FIG. 6 illustrates an example of importance analysis based on adversarial inputs in accordance with an illustrative embodiment. The framework of the illustrative embodiment receives an input sentence, "I need assistance with W2" in this example.

Then, the framework generates adversarial inputs by masking single token words. For example, the word "I" is masked in a first adversarial input, the word "need" is masked in a second adversarial input, and the word "assistance" is masked in a third adversarial input.

The framework performs intent specific importance highlighting using the target intent (employee_form_help) and the other intents from the adversarial inputs (e.g., Help and AccessRequest). FIG. 6 illustrates sensitivity on intent. The candidate entity with the highest importance score for the target intent is "W2." The candidate entity with the highest importance score for the intent of Help is "assistance," and the candidate entity with the highest importance score for the intent of AccessRequest is "with."

The framework also performs stop-word filtering to filter all terms of the input statement that are contained in the specified stop word list. These stop-words may be the most common words in a language; however, the stop-words may include other words that are deemed to be unimportant depending on the implementation. In the depicted example, the word "with" is filtered as a stop-word.

The framework then performs discriminative adjustment on the importance scores of the words based on the importance score for the target intent and importance scores for the other intents based on the adversarial inputs. In one example embodiment, the discriminative adjustment is calculated based on the following equation:

$$Finalscore_{(token)} = Score(token)_{target} - \underset{t \neq target}{\text{mean}} Score(token)_t$$

Figures 7A, 7B, 9:
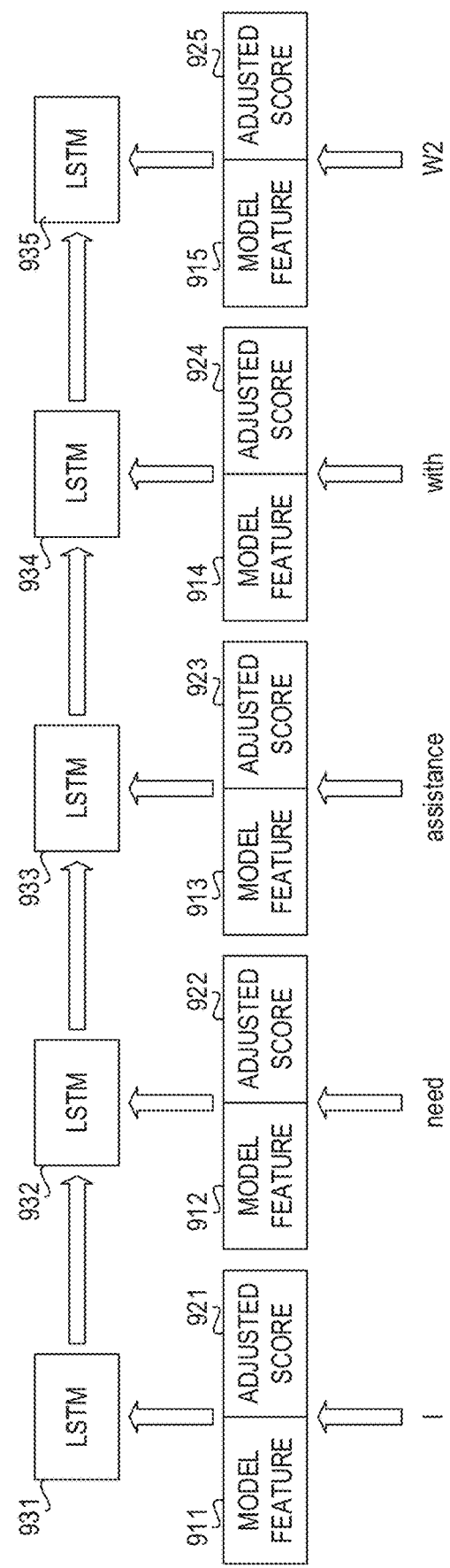
FIGS. 7A and 7B show importance scores and adjusted scores for the tokens in the input sentence in accordance with an illustrative embodiment.
FIG. 9 depicts an example Name Entity Recognition (NER) model with suggested entity based on importance analysis in accordance with an illustrative embodiment.

FIGS. 7A and 7B show importance scores and adjusted scores for the tokens in the input sentence in accordance with an illustrative embodiment. As seen in the example shown in FIG. 7A, the importance score for the target intent for the token "W2" is 0.65, and the importance score for the token "assistance" is 0.35. After discriminative adjustment, the final score for "W2" is 0.65, and the importance score for "assistance" is 0.15. FIG. 7B shows the candidate tokens ranked by adjusted score.

The framework then applies a threshold to the adjusted score. For instance, if one were to apply a threshold of 0.50 to the adjusted scores in FIG. 7B, the only remaining candidate entity is "W2," because "assistance" and "need" would not be greater than or equal to the threshold.

Figure 8:
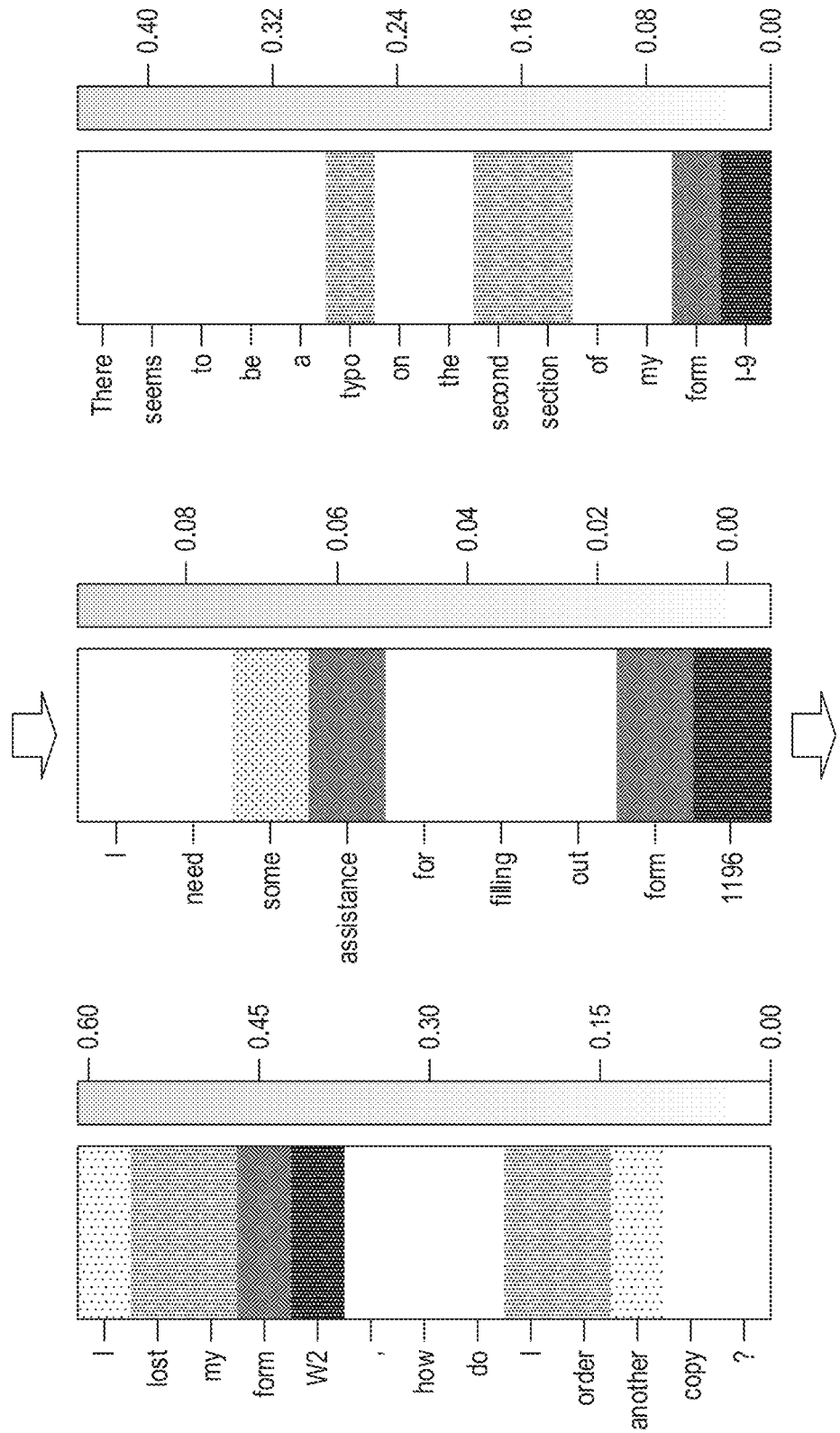
FIG. 8 illustrates example sensitivity on intent for several input sentences in accordance with an illustrative embodiment.

FIG. 8 illustrates example sensitivity on intent for several input sentences in accordance with an illustrative embodiment. The framework determines candidate entities for each of the input sentences based on the target intent of "employee_form_help." For the input sentence, "I lost my form W2, how do I order another copy?" the candidate entity with the highest adjusted importance score is "W2." For the input sentence, "I need some assistance for filling out form 1196," the candidate entity with the highest adjusted importance score is "1196." For the input sentence, "There seems to be a typo on the second section of my form I-9," the candidate entity with the highest adjusted importance score is "I-9." Thus, the framework suggests the appropriate new entity candidates for the target intent.

In one example use case, the framework suggests new entities for a chatbot builder for convenient labelling. In this use case, the adjusted importance score may be considered a confidence score representing a confidence that a given token is an informative entity type suggestion. Thus, an entity candidate of "W2" may have a confidence of 0.65 for the sentence, "I need assistance with W2," and a confidence of 0.69 for the sentence, "I lost my W2, how do I order another copy?"

In another example use case, the adjusted importance score may provide an additional feature to a Name Entity Recognition (NER) system. FIG. 9 depicts an example Name Entity Recognition model with suggested entity based on importance analysis in accordance with an illustrative embodiment. In the depicted example, the token "I" generates model feature 911 and adjusted score 921, the token "need" generates model feature 912 and adjusted score 922, the token "assistance" generates model feature 913 and adjusted score 923, the token "with" generates model feature 914 and adjusted score 924, and the token "W2" generates model feature 915 and adjusted score 925.

Model score 911 and adjusted score 921 are provided to long short-term memory (LSTM) 931, model score 912 and adjusted score 922 are provided to LSTM 932, model score 913 and adjusted score 923 are provided to LSTM 933, model score 914 and adjusted score 924 are provided to LSTM 934, and model score 915 and adjusted score 925 are provided to LSTM 935. Also, LSTM 932 receives an output from LSTM 931, LSTM 933 receives an output from LSTM 932, and so on. Long short-term memory (LSTM) is an artificial recurrent neural network (RNN) architecture used in the field of deep learning. Unlike standard feedforward neural networks, LSTM has feedback connections. It can not only process single data points, but also entire sequences of data. In this example, LSTMs 931-935 process a sequence of tokens from an input sentence or utterance. In this use case, the adjusted importance scores 921-925 are concatenated with the feature vectors 911-915 for better performance.

Figure 10:
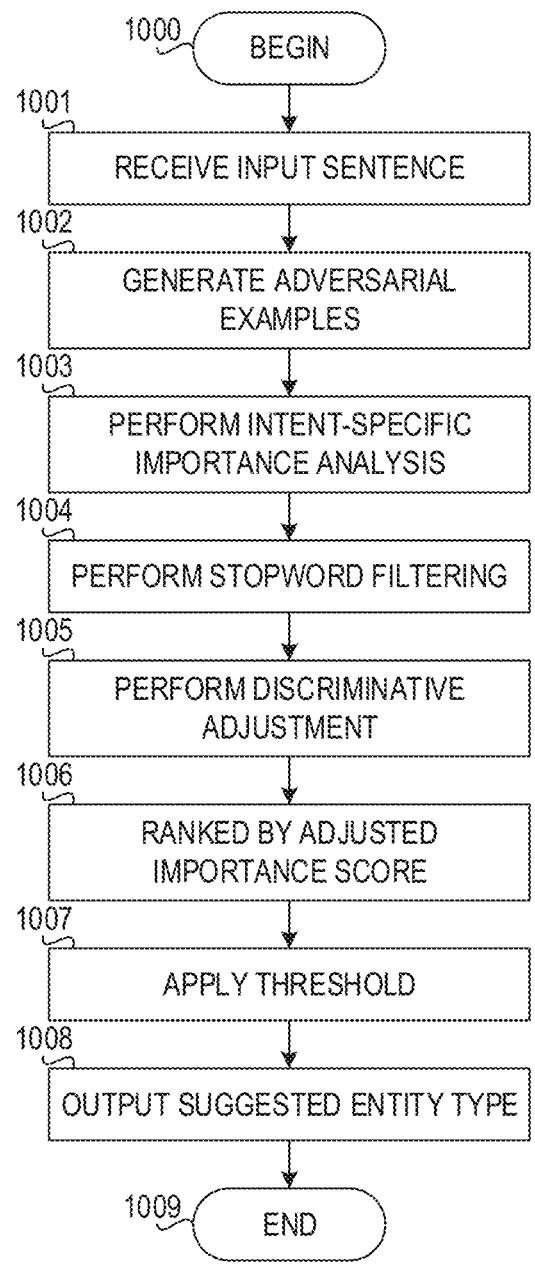
FIG. 10 is a flowchart illustrating operation of a mechanism or framework for suggestion of new entity types with discriminative term importance analysis in accordance with an illustrative embodiment.

FIG. 10 is a flowchart illustrating operation of a mechanism or framework for suggestion of new entity types with discriminative term importance analysis in accordance with an illustrative embodiment. Operation begins (block 1000), and the mechanism receives an input sentence (block 1001). The mechanism then generates adversarial examples by masking tokens in the input sentence (block 1002). The mechanism then performs intent-specific importance analysis to generate an importance score for each token in the input sentence based on sensitivity on intent (bock 1003).

The mechanism performs stop-word filtering (block 1004). The mechanism then performs a discriminative adjustment to generate an adjusted importance score for each remaining token in the input sentence (block 1005). The mechanism ranks the tokens by adjusted importance score (bock 1006) and applies a threshold (block 1007). Thereafter, the mechanism outputs the suggested entity type(s) (block 1008), and operation ends (block 1009).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to specifically configure the processor to implement suggestion of new entity types with discriminative importance analysis, the method comprising:
    receiving, in an artificial intelligence conversational computing system, an input natural language sentence;
    processing the input natural language sentence to identify a target intent of the input natural language sentence;
    generating a set of adversarial examples based on the input natural language sentence, each adversarial example having a corresponding adversarial example intent to thereby generate a list of predefined intents;

performing intent-specific importance analysis on the input sentence to generate an importance score for each token in the input sentence at least by:
generating an importance score for each token of the input sentence based on sensitivity to the target intent;
adjusting the importance score for one or more tokens in the input sentence based on sensitivity of the one or more tokens to one or more of the adversarial example intents in the list of predefined intents; and
ranking the tokens in the input sentence based on their corresponding importance scores to generate a ranked set of tokens; and
configuring the artificial intelligence conversational computing system to process a token with a highest rank, in the ranked set of tokens, as a new entity in conversational recognition during an automated dialog with a user.

2. The method of claim 1, wherein generating the set of adversarial examples of the input sentence comprises masking each token in the input sentence.

3. The method of claim 1, wherein performing intent-specific importance analysis further comprises performing a discriminative adjustment to the importance score based on the importance score for each token of the input sentence based on sensitivity to the target intent and the importance score for each token in the input sentence based on sensitivity to each of the remaining intents.

4. The method of claim 3, wherein performing the discriminative adjustment comprises determining an adjusted importance score for each given token according to the following equation:

$$Finalscore(\text{token}) = \text{Score}(token)_{target} - \operatorname*{mean}_{t \neq \text{target}} \text{Score}(token)_t,$$

wherein Score(token)$_{target}$ is the importance score for the given token on sensitivity to the target intent, Score(token)$_t$ is the importance score for the given token based on sensitivity to a given remaining intent (t), and Finalscore(token) is the adjusted importance score for the given token.

5. The method of claim 3, wherein ranking the tokens in the input sentence by importance score comprises ranking the tokens in the input sentence by the adjusted importance score.

6. The method of claim 5, wherein ranking the tokens in the input sentence by importance score comprises applying a threshold to the adjusted importance scores.

7. The method of claim 1, wherein performing intent-specific importance analysis further comprises performing stop-word filtering on the tokens of the input sentence.

8. The method of claim 1, wherein ranking the tokens in the input sentence by importance score comprises applying a threshold to the importance scores of the tokens of the input sentence.

9. The method of claim 1, wherein configuring the artificial intelligence conversational computing system further comprises configuring a chatbot associated with the artificial intelligence conversational computing system, to process the token with the highest importance score as the new entity for chatbot recognition during the automated dialog with the user.

10. The method of claim 1, further comprising:
configuring a Named Entity Recognition computer model to concatenate the importance score to a feature vector for each token in the Name Entity Recognition computer model when processing natural language content.

11. A computer program product comprising a computer readable storage medium having a computer readable program stored therein, wherein the computer readable program, when executed on a processor of a data processing system, causes the data processing system to implement suggestion of new entity types with discriminative importance analysis, wherein the computer readable program causes the data processing system to:
receive, in an artificial intelligence conversational computing system, an input natural language sentence;
process the input natural language sentence to identify a target intent of the input natural language sentence;
generate a set of adversarial examples based on the input natural language sentence, each adversarial example having a corresponding adversarial example intent to thereby generate a list of predefined intents;
perform intent-specific importance analysis on the input sentence to generate an importance score for each token in the input sentence at least by:
generating an importance score for each token of the input sentence based on sensitivity to the target intent;
adjusting the importance score for one or more tokens in the input sentence based on sensitivity of the one or more tokens to one or more of the adversarial example intents in the list of predefined intents; and
ranking the tokens in the input sentence based on their corresponding importance scores to generate a ranked set of tokens; and
output configure the artificial intelligence conversational computing system to process a token with a highest rank, in the ranked set of tokens, as a new entity in conversational recognition during an automated dialog with a user.

12. The method of claim 11, wherein generating the set of adversarial examples of the input sentence comprises masking each token in the input sentence.

13. The method of claim 9, wherein performing intent-specific importance analysis further comprises performing a discriminative adjustment to the importance score based on the importance score for each token of the input sentence based on sensitivity to the target intent and the importance score for each token in the input sentence based on sensitivity to each of the remaining intents.

14. The method of claim 13, wherein performing the discriminative adjustment comprises determining an adjusted importance score for each given token according to the following equation:

$$Finalscore(\text{token}) = \text{Score}(token)_{target} - \operatorname*{mean}_{t \neq \text{target}} \text{Score}(token)_t,$$

wherein Score(token)$_{target}$ is the importance score for the given token on sensitivity to the target intent, Score(token)$_t$ is the importance score for the given token based on sensitivity to a given remaining intent (t), and Finalscore(token) is the adjusted importance score for the given token.

15. The method of claim 13, wherein ranking the tokens in the input sentence by importance score comprises ranking the tokens in the input sentence by the adjusted importance score and applying a threshold to the adjusted importance scores.

16. The computer program product of claim 11, wherein the computer readable program further causes the data processing system to configure the artificial intelligence conversational computing system at least by configuring a chatbot, associated with the artificial intelligence conversational computing system, to process the token with the highest importance score as a new entity for chatbot recognition during the automated dialog with the user.

17. The computer program product of claim 11, wherein the computer readable program further causes the data processing system to configure a Named Entity Recognition computer model to concatenate the importance score to a feature vector for each token in the Name Entity Recognition computer model when processing natural language content.

18. An apparatus comprising:
 a processor; and
 a memory coupled to the processor, wherein the memory comprises instructions which, when executed by the processor, cause the processor to implement suggestion of new entity types with discriminative importance analysis, wherein the instructions cause the processor to:
  receive, in an artificial intelligence conversational computing system, an input natural language sentence;
  process the input natural language sentence to identify a target intent of the input natural language sentence;
  generate a set of adversarial examples based on the input natural language sentence, each adversarial example having a corresponding adversarial example intent to thereby generate a list of predefined intents;
  perform intent-specific importance analysis on the input sentence to generate an importance score for each token in the input sentence at least by:
   generating an importance score for each token of the input sentence based on sensitivity to the target intent;
   adjusting the importance score for one or more tokens in the input sentence based on sensitivity of the one or more tokens to one or more of the adversarial example intents in the list of predefined intents; and
   ranking the tokens in the input sentence based on their corresponding importance scores to generate a ranked set of tokens; and
  output configure the artificial intelligence conversational computing system to process a token with a highest rank, in the ranked set of tokens, as a new entity in conversational recognition during an automated dialog with a user.

* * * * *